Figure 1:
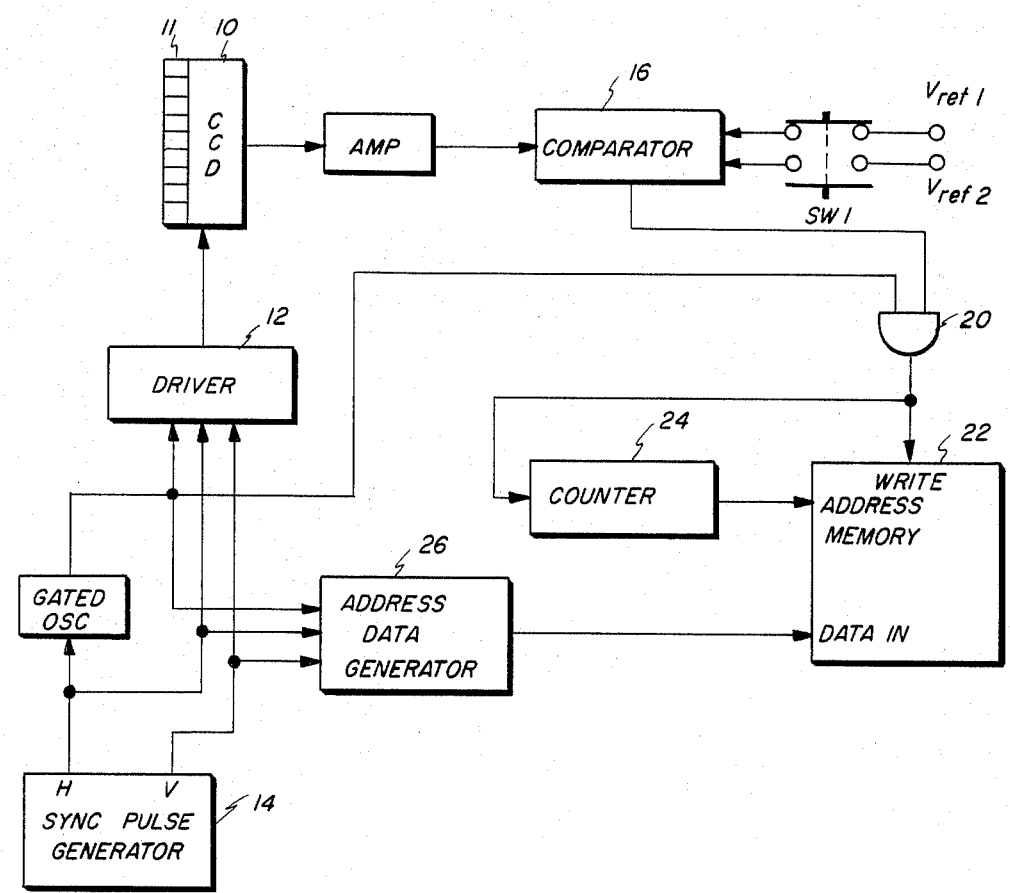

United States Patent [19]

Lemke

[11] Patent Number: 4,524,390

[45] Date of Patent: Jun. 18, 1985

[54] IMAGING APPARATUS

[75] Inventor: James U. Lemke, Delmar, Calif.

[73] Assignee: Eastman Kodak Company, Rochester, N.Y.

[21] Appl. No.: 472,511

[22] Filed: Mar. 7, 1983

[51] Int. Cl.³ .............................................. H04N 3/02
[52] U.S. Cl. .................... 358/213; 358/209; 358/41; 358/163
[58] Field of Search .............. 358/209, 212, 213, 163, 358/167, 41, 45, 227, 43

[56] References Cited

U.S. PATENT DOCUMENTS

| | | | |
|---|---|---|---|
| 3,696,250 | 10/1972 | Weimer | 250/220 M X |
| 3,801,884 | 4/1974 | Sequin | 317/234 R |
| 3,932,775 | 1/1976 | Kosonocky | 307/311 |
| 3,946,151 | 3/1976 | Kamiyama et al. | 178/7.1 |
| 3,975,760 | 8/1976 | Yamanaka et al. | 358/41 |
| 4,001,501 | 1/1977 | Weimer | 358/160 |
| 4,010,319 | 3/1977 | Levine | 358/213 |
| 4,013,828 | 3/1977 | Judice | 358/133 |
| 4,016,598 | 4/1977 | Yamanaka | 358/41 |
| 4,152,725 | 5/1979 | Beckmann | 358/109 |
| 4,183,044 | 1/1980 | Breithaupt | 358/17 |
| 4,205,336 | 5/1980 | Nagumo | 358/43 |
| 4,220,971 | 9/1980 | Lambeth | 358/160 |
| 4,220,977 | 9/1980 | Yamanaka | 358/213 |
| 4,237,488 | 12/1980 | Takemura | 358/163 |
| 4,240,103 | 12/1980 | Poetsch | 358/21 R |
| 4,246,598 | 1/1981 | Bock et al. | 358/12 |
| 4,281,339 | 7/1981 | Morishita et al. | 358/52 |
| 4,414,573 | 11/1983 | Griesshaber et al. | 358/163 |
| 4,470,676 | 9/1984 | Kinoshita et al. | 354/406 |

Primary Examiner—Gene Z. Rubinson
Assistant Examiner—Robert Lev
Attorney, Agent, or Firm—Robert F. Cody

[57] ABSTRACT

The disclosed apparatus provides for an image to be "beam-split" between (typically) two similar—but defective—imagers. While the two imagers in question are similar in all respects, the locations of their respective defective pixels are not. Respective programmable read-only-memories (PROMS) cooperate with each of the imagers and serve to memorize the locations of the defective pixels of the imagers. If the two imagers are scanned simultaneously, then, by toggling between the imagers each time a defective pixel is read in either of the imagers, a perfect video signal (regardless of whether the imagers have isolated defective pixels, or whether such defective pixels are aligned along given rows or columns of the imagers) may be provided.

16 Claims, 3 Drawing Figures 4,524,390

IMAGING APPARATUS

BACKGROUND OF THE INVENTION (1) Field of the Invention

This invention relates in general to electronic imaging and in particular to a technique for correcting for defects in solid state imaging apparatus.

(2) Description Relative to the Prior Art

Solid state imaging, such as by means of a charge coupled device (CCD), has found wide acceptance in the video arts for a variety of reasons, among which are low power consumption, high sensitivity, and potential cost saving as the technology for producing such devices matures. A typical CCD imager, as representative of the general class of imagers in question, comprises an array of a large number of evenly distributed elemental photoresponsive picture elements, i.e. pixels: the greater the number of pixels per imager, the greater the image resolution of the imager. While there is a trend toward employing more and more pixels per imager for image resolution purposes, it is recognized that the greater the number of pixels that an imager has, the greater will be the chance that one or more of the pixels will be bad, thereby possibly rendering the imager useless. Two kinds of pixel defects are generally known to exist in a solid state imager: a "dead" pixel in which little or no image representative photocharge can exist; and a "hot" pixel in which too much photocharge gets accumulated due, for example, to electrical dark current leakage at the pixel. Thus, despite the trend toward more and more pixels per imager, practical design considerations often militate against using more pixels per imager than are absolutely necessary.

Various relatively straightforward techniques are known for obviating the effect of one or more defective pixels in a CCD imager. See, for example, U.S. Pat. No. 4,253,120, issued Feb. 24, 1981, which teaches that, if lower resolving optics for imaging onto a high resolution imager are employed, any given image spot will overlap more than one pixel; and, attendantly, when a pixel is bad, interpolation can be employed to obscure, in real time, the effect of such bad pixel. It is also known to memorize, by use, for example, of a read-only-memory (ROM), the locations of defective pixels of an imager, thereby to produce appropriate correction signals (typically signals corresponding to neutral gray) as substitutes for signals produced by dead and hot pixels. Regardless of which of the aforementioned schemes is employed, correction for defective pixels is usually less than perfect. The latter scheme merely works to dull the effect of a defective pixel; and the former works in a way that, in essence, guesses at what occurs between pixels.

U.S. Pat. No. 4,237,488 teaches a variant of the aforenoted practice of memorizing the locations of defective pixels of an imager, utilizing as "correction signals" signals which correspond to pixels in proximity to defective pixels. In the event, for example, that the 39th pixel of row #10 of an imager is bad, such pixel location is memorized; then, each time the pixel in question is to be read during operation of the imager, the signal from the 39th pixel of row #9 is (typically) substituted for the signal from the bad pixel of row #10. While this technique would appear to be better than the uncorrelated "substitution of neutral gray", it too leaves something to be desired. For example, not only does the teaching of U.S. Pat. No. 4,237,488 require a precision dynamic buffer for storing prior video information for signal-substitution purposes, but such a tack involves the substitution of information which is only partially correlated with bad pixel information, i.e. the substituted information is not the same as, but only similar to, the defective pixel information. Thus, depending on the number of bad pixels of an imager, information substitution as taught in U.S. Pat. No. 4,237,488 will correspondingly work to blur the image produced by means of the imager. Perhaps more important than either of the aforenoted shortcomings of the apparatus of U.S. Pat. No. 4,237,488, however, the technique of U.S. Pat. No. 4,237,488, when applied to color imaging, requires customization according to the color filter array which is employed to break a scene into its constituent colors. In the event, for example, that the color filter array in question is a column-wise striped filter, it (of course) is okay for there to be the substitution of information from a pixel of a former line for defective information from a similarly numbered pixel of a subsequent line . . . this being because the two pixels in question, by design, correspond with information of the same color; if, however, a color filter array having any of a variety of checkered patterns is employed, it makes little sense to substitute information from a pixel of one line for information from a defective similarly numbered pixel of a subsequent line because such substitute information will, of necessity, correlate with a different color than that associated with the defective pixel. This means, then, that the information substitution scheme of U.S. Pat. No. 4,237,488 must be customized according to the form of color filter array which is employed, a matter which can lead to hardware complexity depending on the information-substitution technique which is required.

SUMMARY OF THE INVENTION

In the manufacture of solid state imaging devices, it is common, especially on a batch-by-batch basis, for there to be little or no correlation among the defects of different imaging devices, notwithstanding the fact that the imaging devices are alike and to within photolithographic accuracy. Drawing on this fact, the invention provides for an image to be "beam-split" between (typically) two similar—but defective—imagers. While the two imagers in question are similar in all respects, the locations of their respective defective pixels are not. Respective programmable read-only-memories (PROMS) cooperate with each of the imagers and serve to memorize the locations of the defective pixels of the imagers. If the two imagers are scanned simultaneously, then, by toggling between the imagers each time a defective pixel is read in either of the imagers, a perfect video signal (regardless of whether the imagers have isolated defective pixels, or whether such defective pixels are aligned along given rows or columns of the imagers) may be provided . . . this being because the substitute and defective information are inherently in perfect correlation. Attendantly, use may be made of imaging devices which would otherwise be destined for the trash-heap.

The invention will now be discussed with reference to the figures of which

Figure 2:
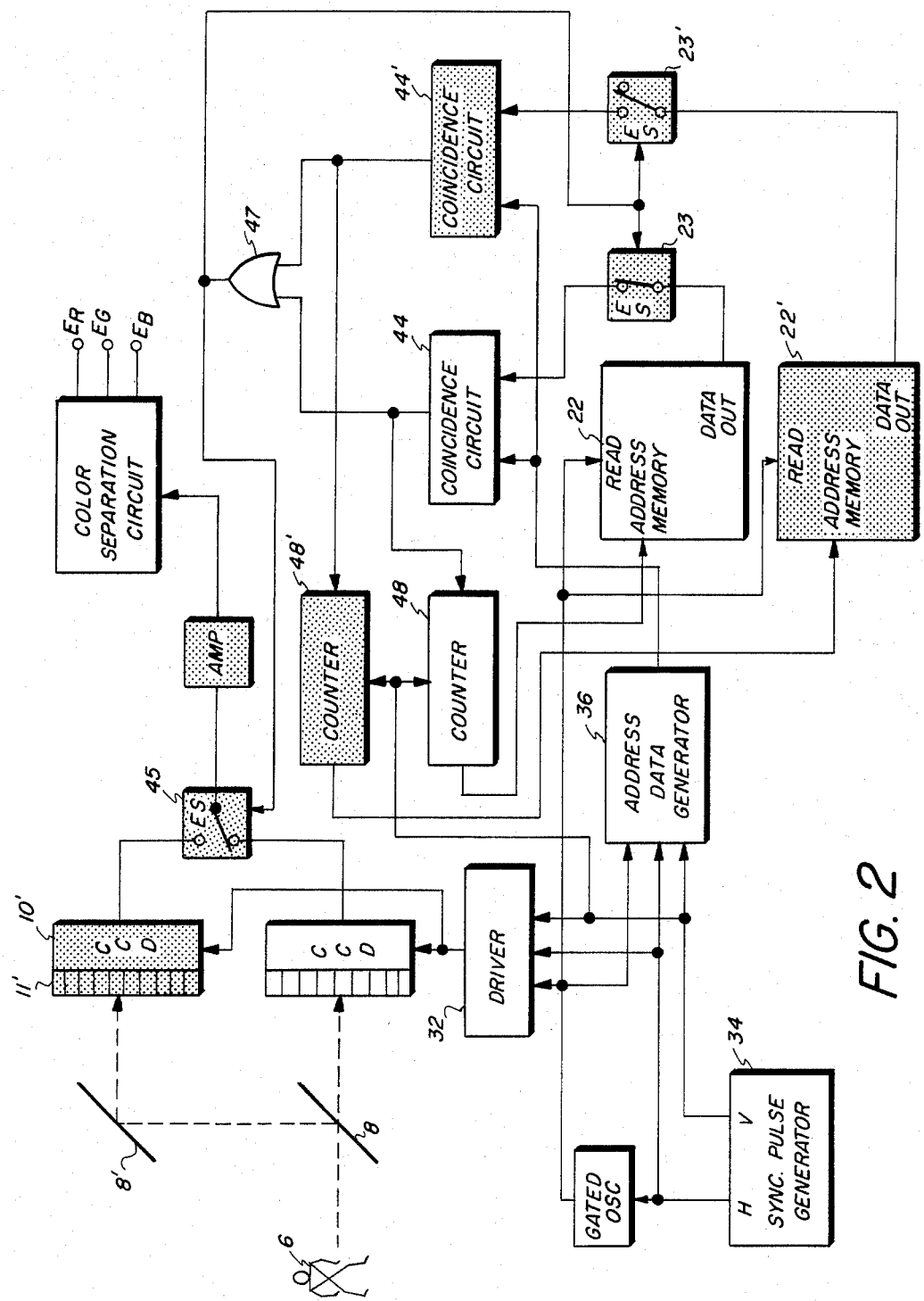
Figure 3:
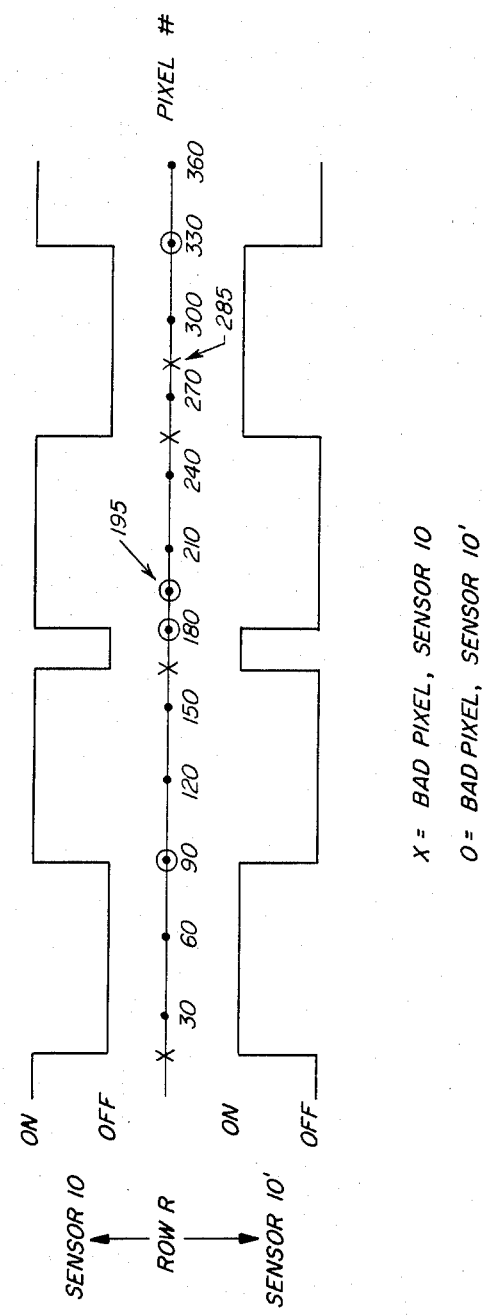

FIG. 1 is a schematic block diagram of a prior art circuit useful in identifying defects in a solid state image sensor, FIG. 2 is a schematic block diagram of a prior art circuit modified to include apparatus for implementing the invention, and FIG. 3 is a set of waveform diagrams useful in describing the apparatus of FIG. 3.

The circuit of FIG. 1, it will be noted, is shown and described in U.S. Pat. No. 4,237,488. Indeed, to facilitate comparison with U.S. Pat. No. 4,237,488, the same character numbers employed in that patent are also employed herein . . . the use (in FIG. 2) of primed character notation, however, signifying identical, "same-use", hardware as is identified by unprimed character notation. Although the circuit description which appears in U.S. Pat. No. 4,237,488 is fairly extensive, it is believed appropriate to provide herein an overview of such circuit and a brief description of how such circuit works to identify and memorize the locations of defects in a solid state sensor: A solid state area array image sensor 10 having a striped (or, if preferred, a checkered) color filter array 11, for breaking a color image into its constituent colors, is electronically scanned by a driver 12. The driver 12 scans the image sensor 10 line-by-line in response to horizontal sync pulses produced by a sync pulse generator 14; at the end of the last line of any given image field, a vertical sync pulse from the pulse generator resets the line-by-line scanning for the next image field; and so forth.

An address data generator 26, which is synchronized to the scanning of the image sensor 10, keeps track of the specific sensor pixel being addressed.

For defect identification, two distinct reference voltages are employed: one ($V_{ref1}$) corresponding to a signal level from a "hot" pixel; the other ($V_{ref2}$) corresponding to a signal level from a "dead" pixel. The reference voltages are alternately applied to a comparator 16 via a switch SW1 which, in response to a coincident (bad pixel) condition, gates (20) a WRITE command to a memory device 22, e.g. a programmable read-only-memory (PROM). In response to the WRITE command, the address data generator 26 applies the address of the bad pixel to the memory device 22. To keep track of the address within the memory device 22, where the address of the bad pixel is stored, an address counter 24 is provided. Each time the address of a bad pixel is entered into the memory device 22, the comparator 16 increments the address count of the counter 24 via the gate 20, thereby to ready the memory device 22 for the address of the next defective pixel which is identified.

Reference should now be had to FIG. 2 which shows apparatus for utilizing the defect-memorizing hardware (memory 22) discussed above. The circuit of FIG. 2 is also taken from U.S. Pat. No. 4,237,488, but has been modified to include apparatus comprising the invention:

An image 6 is beam-split (8, 8') between two charge-coupled imaging sensors 10, 10'. The imaging sensors 10, 10' are identical, save for the fact that each has its own respective assortment of defects; and each sensor is equipped with a respective identical color filter array 11, 11' (of any configuration . . . striped, checkered, or otherwise). The sensors 10, 10' are operated in unison by a driver 32 in response to horizontal and vertical image scanning signals produced by a horizontal and vertical sync pulse generator 34. This operation is akin to that disclosed earlier in connection with components 12 and 14 of FIG. 1. As the imaging sensors 10, 10' are scanned, an address data generator 36 keeps track of the address of the particular pixel being accessed; and such address is continuously applied simultaneously to a pair of coincident circuits 44, 44'. A pair of memory address counters 48, 48'—which are both initially set to their respective lowest address counts—cooperate respectively with pre-programmed (with defect-address data) memory devices 22, 22'. The memory devices 22, 22' are each read at the pixel rate; and each memory device cooperates with a respective coincidence circuit 44, 44' via respective electronic switches 23, 23'. As indicated, the switches 23, 23' are operated in flip-flop fashion, so that when the switch 23 is closed, the switch 23' is open, and vice versa.

Given that the scanning of the imaging sensor 10 has caused a first defective pixel thereof to be accessed, its address is applied to the coincidence circuit 44 by the address data generator 36. Contemporaneously, the memorized location of that defect is also applied to the coincidence circuit 44 via the electronic switch 23, and attendantly the coincidence circuit 44 pulses an electronic switch 45 via an OR gate 47. Thus, because the sensor 10 pixel in question is bad, the circuit of FIG. 2 works to switch the effective sensor output to the corresponding non-defective pixel of the sensor 10', this being effected as the switch 45 toggles.

Having switched the sensor output to the sensor 10', the switches 23 and 23' have become respectively opened and closed . . . and, importantly, the counter 48 is incremented for the second defective pixel of the sensor 10. This means, therefore, that the address of the second defective pixel of the sensor 10 appears (at the pixel rate) at the data output of the memory 22, although no use is yet made of such data because the switch 23 is open.

As the scanning operation continues, the address of the first defective pixel of the imaging sensor 10' gets applied by the memory device 22' (at the pixel rate) to the coincidence circuit 44' and, at the instant the address data generator 36 reaches the address of the first defective pixel of the sensor 10', the coincidence circuit 44' pulses the switch 45 via the OR gate 47. This causes the effective sensor output to switch from the bad pixel of the sensor 10' to the corresponding good pixel of the sensor 10; and, similar to what was stated above, the counter 48' is incremented for the second defective pixel of the sensor 10' . . . the switches 23 and 23' being now closed and opened by the output of the OR gate 47. This operation, as described, continues with the effective sensor output coming from the sensor 10 until its second defective pixel is accessed, at which time the effective sensor output is switched to the sensor 10', and so on.

FIG. 3 graphically demonstrates the switching between sensors 10, 10' while scanning a given 360-pixel row R of the sensors: As indicated, the 15th pixel of the sensor 10 is defective, causing the effective sensor output to switch to the sensor 10'. Because the 90th pixel of the sensor 10' is bad, the effective sensor output reverts to the sensor 10. Again, while scanning the 165th pixel, the output switches back to the sensor 10' . . . and at pixel 180, the output again reverts to the sensor 10. Such toggling continues to the end of the 360-pixel row. To be noted (arrows at pixels 195 and 285) is that, while scanning a defective pixel of the particular sensor whose output is "not" the effective sensor output, toggling between the sensors is not practiced. This assures that the bad pixel data from the non-effective sensor will never be substituted for good pixel data from the effective sensor.

As has been demonstrated, it is no longer necessary to employ defect-free imaging sensors to provide defect-free image-related signals: Beam-splitting . . . and means for toggling between imaging sensors, as taught above . . . will allow otherwise defective components to be put to good use. Attendantly, the rigid requirements of processes for fabricating imaging sensors may (perhaps) be relaxed, lending to the reduction of costs.

Concerning the matter of beam-splitting, although one such technique is disclosed, other techniques are practicable as well: for example, by mounting a pair of imaging sensors to different faces of an optical prism adapted to receive an image. Concerning the matter of color filter arrays for breaking an image into its constituent colors, as should now be clear, the filter arrays employed in the practice of the invention may be of any form . . . so long as they are identical. Thus, during the aforenoted toggling between imaging sensors, the substitution of a pixel of one color will always be for a corresponding pixel of that very same color.

The invention has been described in detail with particular reference to preferred embodiments thereof, but it will be understood that variations and modifications can be effected within the spirit and scope of the invention. For example, although two separate and respective memory devices (22, 22') are depicted in the FIG. 2 embodiment of the invention, it would be possible, within the purview of the invention, to employ, with suitable addressing logic, a single memory device for storing the pixel defects of both imaging devices (10, 10'); or, if desired, the FIG. 2 hardware could be configured with three (or more) imaging devices employing, not a two-way beam-split, but rather a three-way splitting of the image beam. Furthermore, although it is indicated that toggling between two sensors is a preferred way to substitute good pixel information for bad pixel information, it is also within the purview of the invention to utilize (via a one-shot circuit) a single sensor for all but the defective pixel information of that sensor.

What is claimed is:

1. Apparatus for producing signals corresponding to an optical image, said apparatus comprising
   (a) first and second area array imaging devices comprised of respective rows of pixels, either of which devices may have one or more defective pixels, the defective pixels of one imaging device being different from the defective pixels of the other,
   (b) beam-splitting means adapted to receive said optical image and to image said optical image simultaneously upon both said first and second imaging devices,
   (c) memory means adapted to store the addresses of defective pixels of both said imaging devices,
   (d) means for simultaneously scanning row-by-row both said imaging devices to produce signals in correspondence with the pixels thereof,
   (e) output means,
   (f) signal actuable switch means for receiving the signal outputs of said first and said second imaging devices and for conveying one or the other of said said outputs to said output means, and
   (g) means cooperative with said means for scanning and said memory means for producing a switch actuating signal when there is coincidence between the instantaneous scanned address of a defective pixel of one imaging device and the address of a stored defective pixel of that imaging device, said switch actuating signal being applied to said switch means for actuating said switch and thereby causing the signal output of said switch means to represent, without defect, said optical image.

2. The apparatus of claim 1 wherein both said imaging devices are charge-coupled devices, and wherein both said charge-coupled devices are equipped with identical color filter arrays for breaking the respective optical images received by said charge-coupled devices into their constituent colors.

3. The apparatus of claim 2 wherein said memory means is comprised of first and second memory devices cooperative respectively with said first and second imaging devices for storing the respective addresses of the defective pixels of said first and second imaging devices.

4. The apparatus of claim 3 wherein said first and second memory devices are both programmable read-only-memory devices.

5. The apparatus of claim 2 wherein the color filter arrays of said charge-coupled devices are both comprised of color filters arranged in a striped pattern.

6. The apparatus of claim 2 wherein the color filter arrays of said charge-coupled devices are both comprised of colors arranged in a checkered pattern.

7. Apparatus for converting an optical image into an electrical signal corresponding to said optical image comprising
   (a) first and second solid state imaging devices comprised of respective areal distributions of photoresponsive picture elements (pixels), said devices being alike save for the fact that corresponding defective pixels of the two devices are different,
   (b) means for storing the pixel addresses of the defects of said first and second imaging devices,
   (c) means for imaging said optical image upon both said imaging devices,
   (d) means for simultaneously scanning in unison both said imaging devices to produce respective imaging device output signals,
   (e) actuating means cooperative with said means for storing for detecting coincidence between the addresses of scanned defective pixels and pixel addresses stored by said means for storing, and
   (f) means cooperative with said actuating means for so switching between the output signals of said imaging devices when said coincidence is detected that the discrete signals associated with defective pixels are never employed to comprise said electrical signal corresponding to said optical image.

8. The apparatus of claim 7 wherein said first and second imaging devices are identical charge-coupled devices, save for their respective defects, and wherein both said charge-coupled devices have associated therewith respective identical color filter arrays for effecting separation of the colors which comprise said optical image.

9. The apparatus of claim 7 wherein said means for storing pixel addresses is comprised of first and second memory devices cooperative respectively with said first and second imaging devices for storing the respective addresses of the defective pixels of said first and second imaging devices.

10. The apparatus of claim 9 wherein said first and second memory devices are both programmable read-only-memory devices.

11. The apparatus of claim 8 wherein the respective color filter arrays associated with said first and second imaging devices are both comprised of color filters arranged in striped patterns.

12. The apparatus of claim 8 wherein the respective color filter arrays associated with said first and second imaging devices are both comprised of color filters arranged in a checkered pattern.

13. Apparatus for deriving a defect-free video signal while employing image sensing means having defective pixels comprising
   (a) a first areal image sensor having a distribution of photoresponsive pixels, at least some of which are defective,
   (b) a second areal image sensor having a similar distribution of photoresponsive pixels as said first image sensor, but having different defective pixels from those of said first image sensor,
   (c) means for memorizing the address locations of the defective pixels of said first sensor, and the address locations of the defective pixels of said second sensor,
   (d) switch means for conveying, depending on how it is set, the signal output from either said first sensor or said second sensor, the output of said switch means constituting said video signal,
   (e) means for simultaneously applying the same optical image to both said first and second sensors,
   (f) means for simultaneously scanning both said first and second sensors in unison, and
   (g) means for so changing the setting of said switch means when a defective pixel of one sensor is encountered during said scanning that the discrete signal corresponding to said defective pixel is replaced in said switch means output video signal by a discrete defect-free signal from the corresponding pixel of the other sensor.

14. The apparatus of claim 13 wherein both said sensors are solid state sensors, and wherein both have associated therewith identical respective color filter arrays for image color separation purposes.

15. The apparatus of claim 14 wherein said solid state sensors are both charge-coupled devices, and wherein said color filter arrays are comprised of color filters arranged in a striped pattern.

16. The apparatus of claim 14 wherein said solid state sensors are both charge-coupled devices, and wherein said color filter arrays are comprised of color filters arranged in a checkered pattern.

* * * * *